United States Patent [19]

Price

[11] Patent Number: 5,498,079
[45] Date of Patent: Mar. 12, 1996

[54] TEMPERATURE TRANSMITTER

[75] Inventor: Timothy D. Price, Chichester, England

[73] Assignee: Rosemount Inc., Eden Prairie, Minn.

[21] Appl. No.: 363,249

[22] Filed: Dec. 23, 1994

[51] Int. Cl.$^6$ ................................. G01K 1/00; H01L 1/02
[52] U.S. Cl. ............................ 374/208; 374/179; 338/28; 338/272; 136/230
[58] Field of Search ..................... 374/179, 183, 374/208, 209; 338/28, 30, 272, 332; 136/200, 230, 232, 234, 235, 242; 73/866.5

[56] References Cited

U.S. PATENT DOCUMENTS

| | | | |
|---|---|---|---|
| 2,156,853 | 5/1939 | Huggins, Jr. ........................... | 136/230 |
| 2,640,902 | 6/1953 | Aske et al. ............................. | 338/28 |
| 3,061,806 | 10/1962 | Stevens ................................. | 338/28 |
| 3,698,954 | 10/1972 | Jones, Jr. .............................. | 136/234 |
| 3,801,377 | 4/1974 | Brewer et al. ........................ | 136/232 |
| 4,958,938 | 9/1990 | Schwartz et al. ..................... | 374/208 |

FOREIGN PATENT DOCUMENTS

| | | | |
|---|---|---|---|
| 611874 | 11/1948 | United Kingdom ................... | 338/332 |
| 2045433 | 10/1980 | United Kingdom ................... | 374/208 |

OTHER PUBLICATIONS

Product Data Sheet PDS 4993, "Model 244P—Head and Rail Mount Temperature Transmitters", Rosemount Inc., Chanhassen, MN, pp. 1–11, Mar. 1994.

Specification 34–ST–03–28/E 0490R3–PA, "STT 3000 Smart Temperature Transmitter–Universal Input Model for Millivolt, Thermocouple and Resistance Temperature Detector Sensors", Honeywell Europe SA, pp. 1–4 (undated).

Preliminary Datasheet TE 22.01, "Digital Temperature Transmitter Head and Rail Mounting, Field Mounting for Pt 100 Resistance Thermometers and Thermocouples Typ T22", WIKA Alexander Wiegand GmbH & Co. (undated).

*Primary Examiner*—William A. Cuchlinski, Jr.
*Assistant Examiner*—Andrew Hirshfeld
*Attorney, Agent, or Firm*—Westman, Champlin & Kelly

[57] ABSTRACT

A temperature transmitter includes a temperature probe, such as an RTD or thermocouple, and a transmitter housing. Electrical circuitry in the transmitter housing is adapted for coupling to the temperature probe and providing an output related to a sensed temperature. The temperature housing has a first side for coupling to the temperature probe and a second side which carried a plurality of electrical connections electrically connected to the circuitry carried in the transmitter housing. An elongated recess on an outer surface of the first side of the transmitter housing channels electrical wiring which connects to the temperature probe in a direction away from the temperature probe and toward the electrical connections carried on the second side of the transmitter housing.

8 Claims, 6 Drawing Sheets

5,498,079

TEMPERATURE TRANSMITTER

REFERENCE TO CO-PENDING APPLICATION

Reference is hereby made to co-pending application Ser. No. 29/033,869 entitled Temperature Transmitter Housing filed on even date herewith and assigned to the same assignee as the present application.

BACKGROUND OF THE INVENTION

The present invention relates to temperature transmitters of the type used to sense a temperature and provide an output related to the sensed temperature. More particularly, the present invention relates to a housing of a temperature transmitter.

A temperature transmitter is a device used to sense a temperature and transmit an output representative of the sensed temperature. For example, temperature transmitters are used in controlling industrial processes by sensing a temperature of the process and transmitting the information to a remote location over a two-wire current loop, such as a control room where the process is controlled.

The temperature transmitter generally includes a housing and a temperature probe which attaches to the housing. Typically, the temperature probe is an elongated element which contains a RTD or thermocouple sensor which connects to electrical probe wiring. A transmitter can function with various different probes and the probes are designed to be removable from the housing. The probe wiring is connected to electrical circuitry in the transmitter housing which converts the output from the RTD or thermocouple into an output related to probe temperature which is suitable for transmission to the remote location. For example, the output can be transmitted over a standard 4–20 mA process control current loop.

In prior art transmitter housings, the temperature probe mounts to a bottom side of the housing and the electrical connections for coupling to the internal electrical circuitry are positioned on the top side of the body. A passageway through the housing carries the electrical probe wiring, for example four wires for a resistance temperature detector (RTD). This passageway provides a path for the electrical wiring between the probe on the bottom side of the transmitter and the electrical connections on the top side of the transmitter.

Prior art "puck-style" temperature transmitters have a centrally located wiring passageway through the transmitter housing. The user threads the wires from the sensing probe (which is screwed to the bottom of the housing) through the wiring passageway and connects the wires to terminal posts on the top of the housing. A sensor requires between two and four-wire cable; a dual sensor probe requires two two-wire cables. Threading the wires through the housing was time consuming and sometimes resulted in frayed insulation on the wires.

It is desirable to maintain the compact size of the transmitter housing, for backwards compatibility in existing installations and for efficient use of space in new installations. However, the prior art passageway through the housing limits the space inside the transmitter and necessitates excessively complex circuit board layout. More expensive electrical components are selected in order to fit components into the limited available internal space. In fact, additional electronics features are forfeited because the number and size of electrical components must be limited.

An improved compact two-wire temperature transmitter is needed which allows for easier board improving layouts, component selection, thereby electronics features and component cost.

SUMMARY OF THE INVENTION

A temperature transmitter includes a temperature probe and a transmitter housing. The transmitter housing contains electrical circuitry therein for coupling to the temperature probe and providing an output related to temperature of the probe. The transmitter housing includes a first side adapted for coupling to the temperature probe and a second side having electrical connections connected to the electric circuitry carried therein. An elongated recess in the first side of the housing is adapted for receiving wires from the temperature probe and conducting them in a direction away from the probe and toward electrical connections on the second side of the transmitter housing.

Providing a channel for the electrical connections such that they may be run along the outside of the transmitter housing increases the amount of space available within the transmitter housing. This space can be used for additional electronics.

DETAILED DESCRIPTION OF THE PREFERRED EMBODIMENTS

Figure 1:
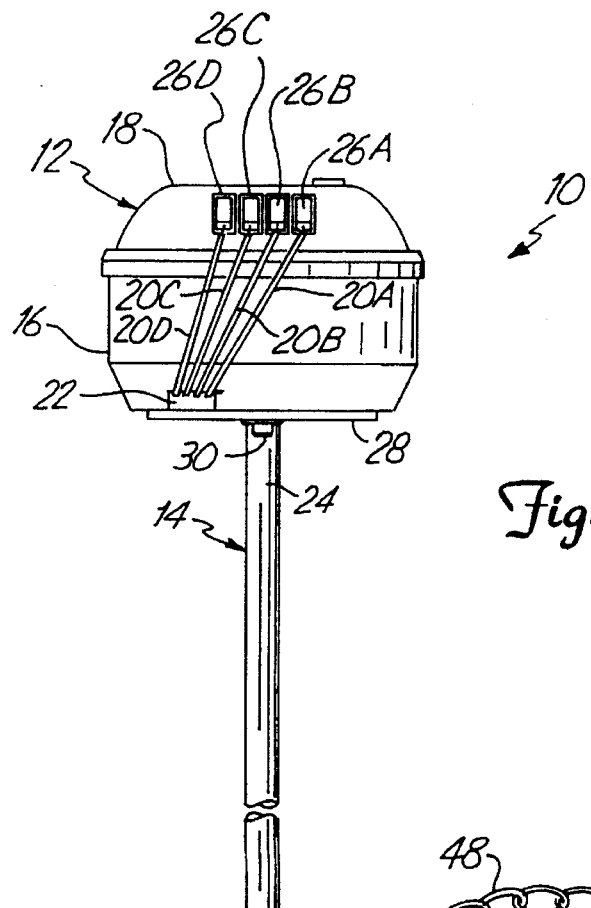
FIG. 1 is a side elevational view of a temperature transmitter in accordance with the invention.

FIG. 1 is a side view of a temperature transmitter 10 including temperature housing 12 and temperature probe 14. Housing 12 includes lower (first housing) 16 and upper housing (second housing) 18. Electrical wires 20A, 20B, 20C and 20D connect to a temperature sensitive device (not shown in FIG. 1) in probe 14. For example, this device may be an RTD or a thermocouple. Lower housing includes slot 22 which conducts wire 20A through 20D in a direction away from elongated portion 24 of probe on a bottom side (first side) of housing 12 toward electrical connections or terminals 26A, 26B, 26C and 26D on a top side of housing 12. Slot 22 provides a space for wires 20A through 20D between the outer surface of lower housing 16 and probe base (mounting surface) 28. Screw 30 secures probe 14 to lower housing 16 at base 28.

Figure 2:
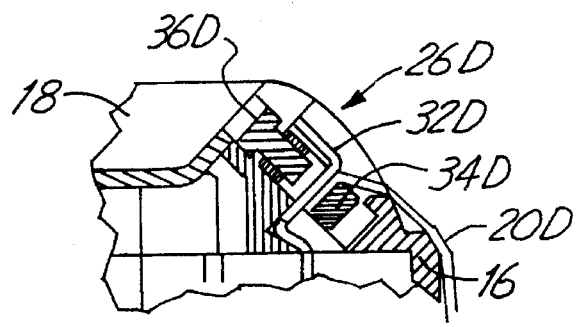
FIG. 2 is a cross-sectional view of a connector of the transmitter of FIG. 1.

FIG. 2 shows a cross sectional view of electrical connector 26D connected to wire 20D shown in FIG. 1. Connector 26D includes metal contacts 32D and 34D which are urged together by screw 36D thereby securing wire 20D. Contact 32D connects to an electrical circuit board carried within housing 12 (not shown in FIG. 2).

Figure 3:
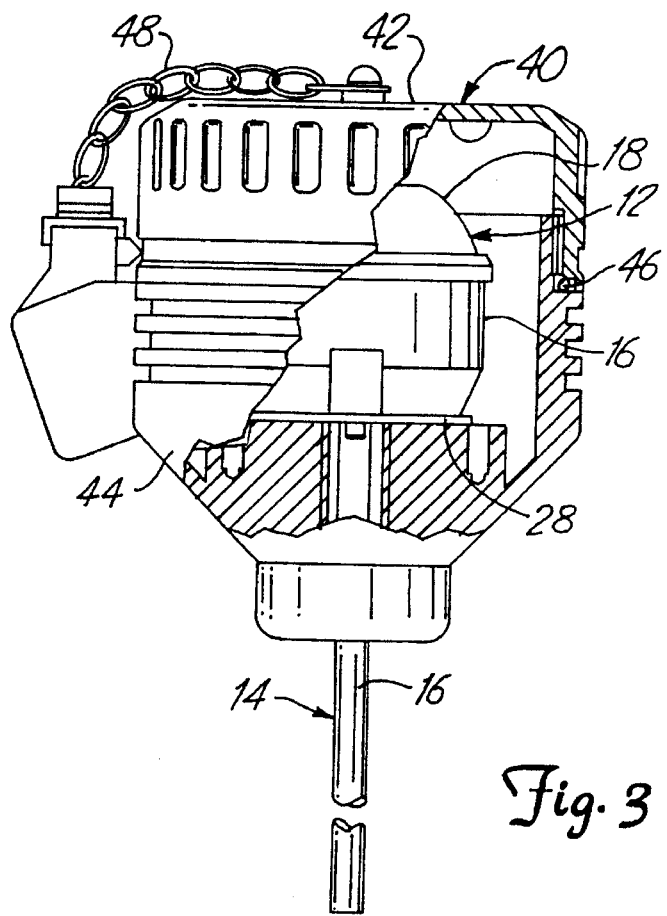
FIG. 3 is a cut away side view of the temperature transmitter of FIG. 1 enclosed in a housing.

FIG. 3 is a cut-away view which shows housing 12 sealed in container 40. Container 40 includes top portion 42 which is screwed together with bottom portion 44 and sealed by 0-ring 46. When top portion 42 is removed from bottom portion 44 to access transmitter housing 12, chain 48 maintains top portion 12 proximate bottom portion 44.

Figure 4:
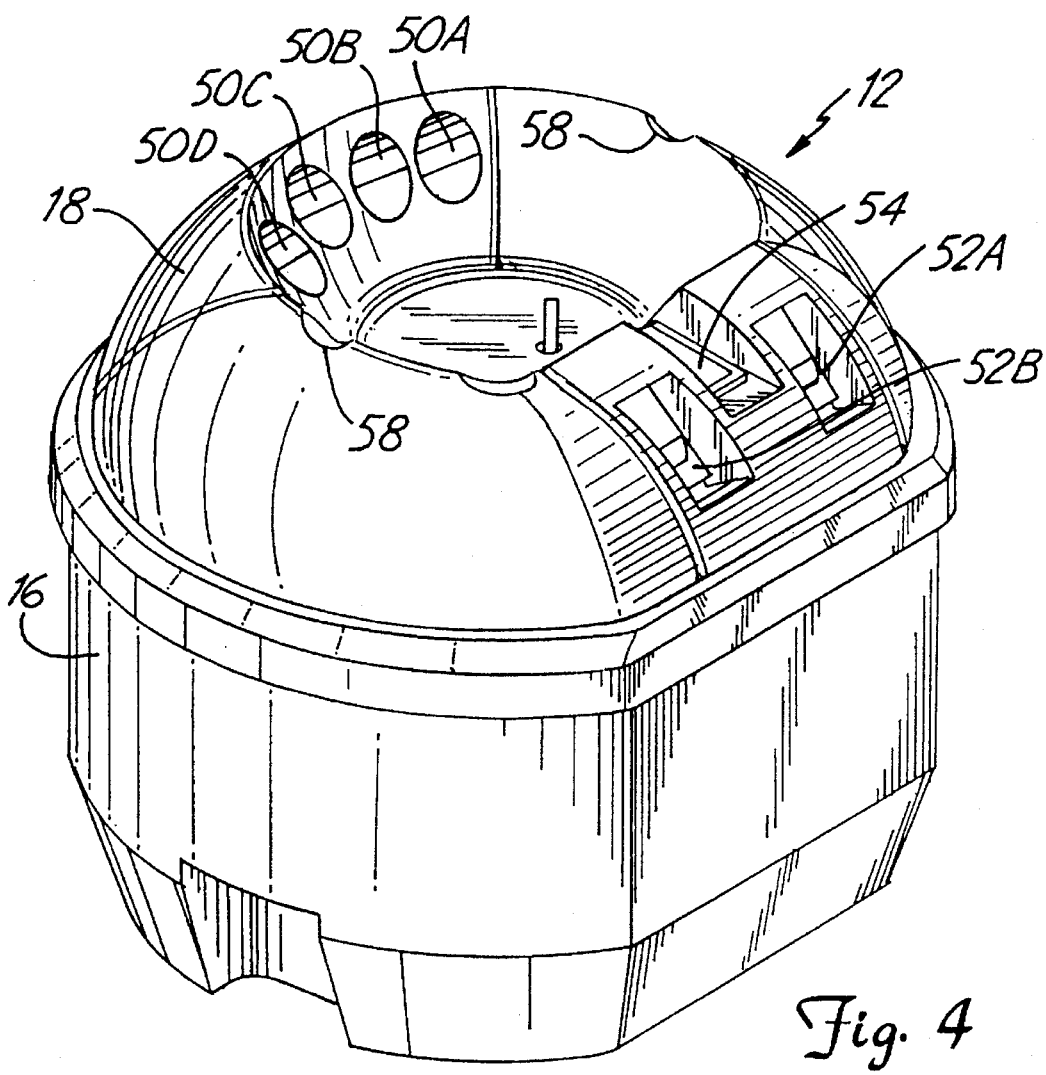
FIG. 4 is a perspective view of the temperature transmitter of FIG. 1.

FIG. 4 is a perspective view of transmitter housing 12 of FIG. 1. Upper housing 18 includes 4 screw holes 50A, 50B, 50C and 50D each of which receives one of four screws 36A through 36D of connectors 26A through 26D screws (not shown in FIG. 4; one screw 36D is shown in FIG 2). FIG. 4 also shows loop connectors 52A and 52B which connect to, for example, a two-wire process control loop such as a 4–20 mA current loop. Connectors 52A and 52B are similar to connectors 26A through 26D. Upper housing 18 also includes on-off switch 54.

Figure 5:
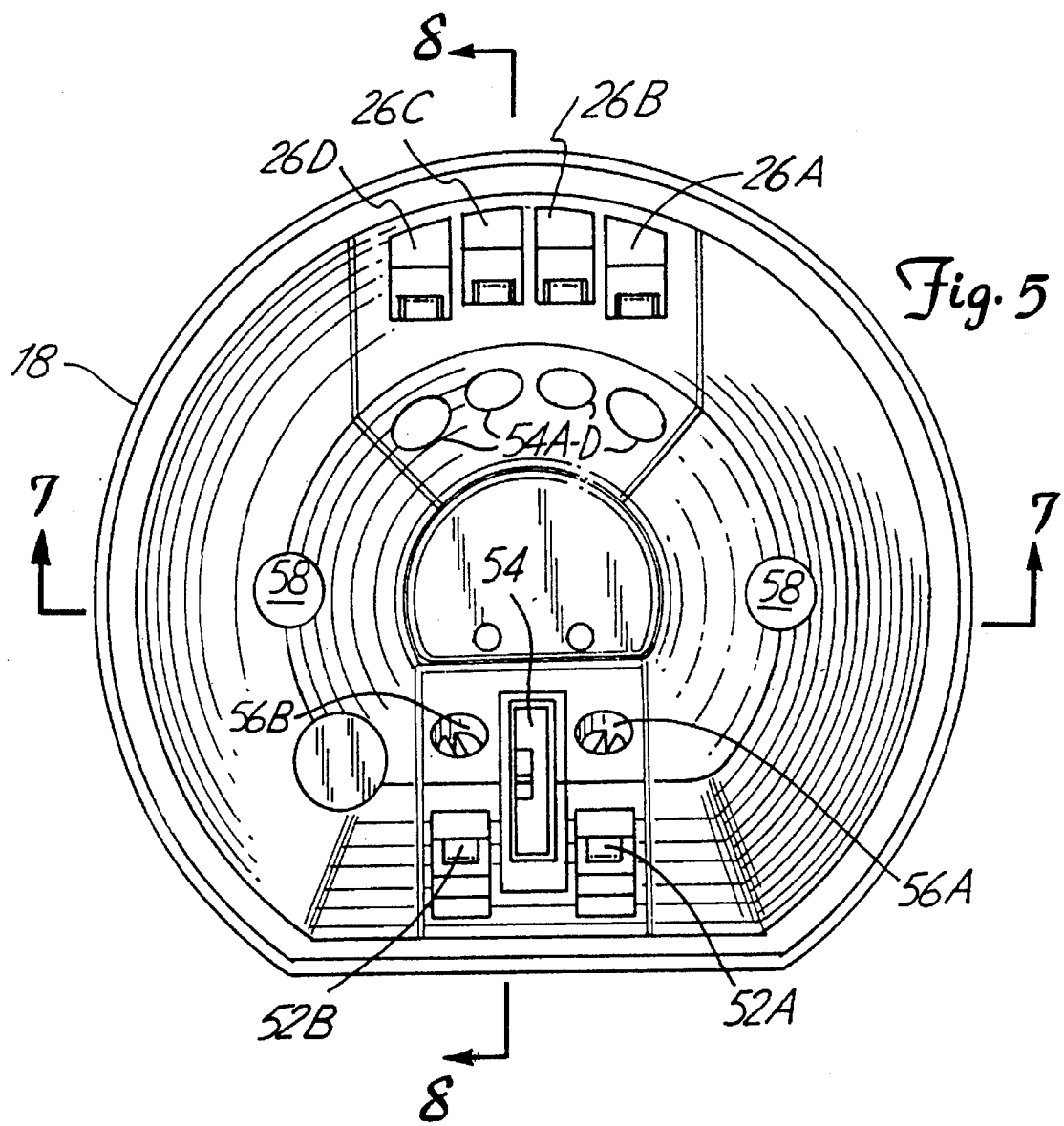
FIG. 5 is a top plan view of the temperature transmitter of FIG. 1.

FIG. 5 is a top plan view of upper housing 18 which also shows screws 56A and 56B of connectors 52A and 52B, respectively. The top plan view of FIG. 5 also shows mounting holes 58.

Figure 6:
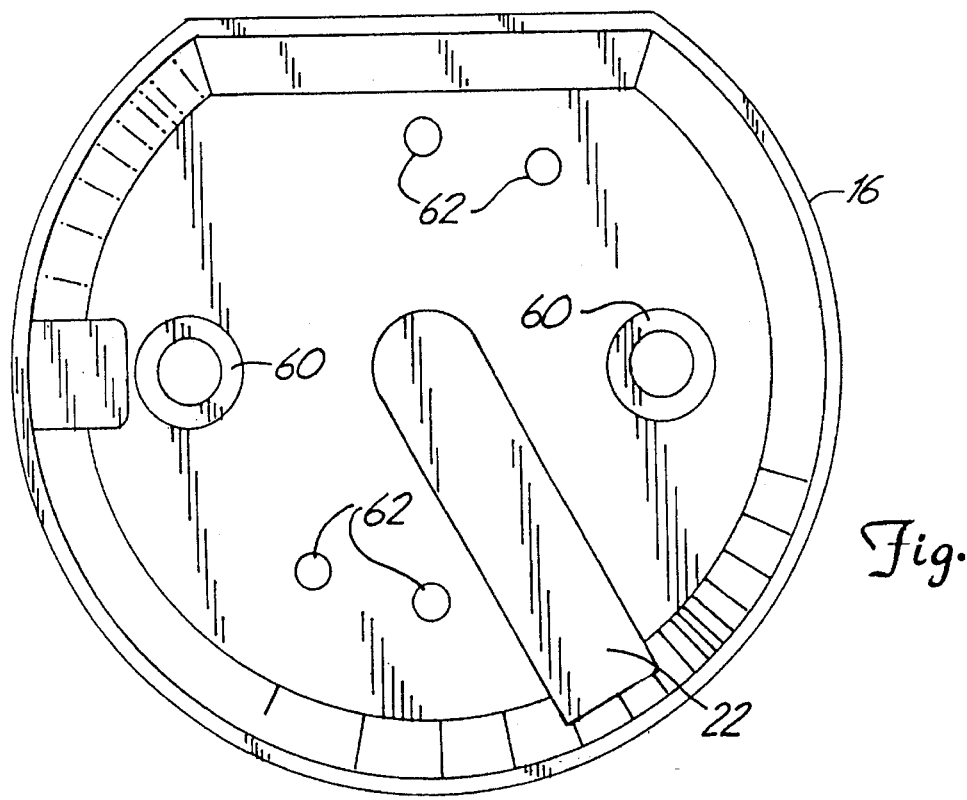
FIG. 6 is a bottom plan view of the temperature transmitter of FIG. 1.
Figure 7:
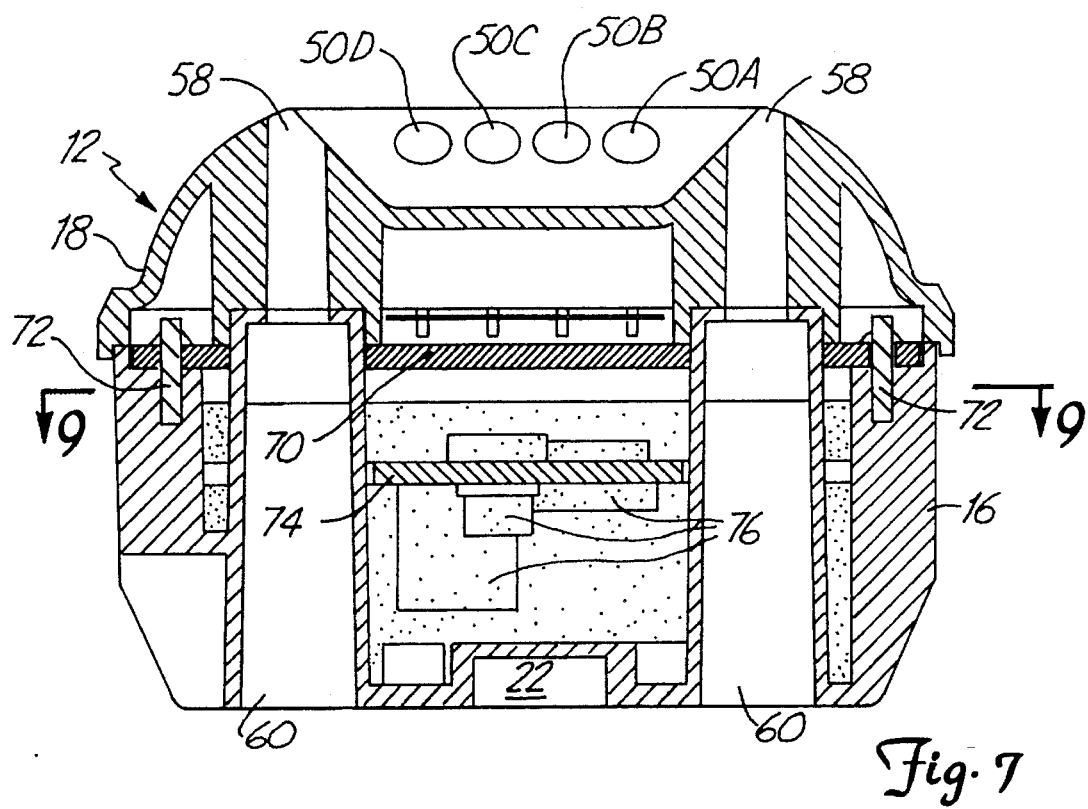
FIG. 7 is a cross-sectional view of the temperature transmitter of FIG. 1 taken along the line labeled 7—7 in FIG. 5.

FIG. 6 is a bottom plan view of bottom housing 16 which shows slot 22, mounting holes 60 and threaded probe mounting holes 62. Mounting holes 60 are aligned with mounting holes 58 of top cover 18 shown in FIG. 5. Mounting holes 62 are used for attaching probe 14 to housing 12 using, for example, screw 30 shown in FIG. 1. FIG. 7 shows connector circuit board 70 which electrically connects to connectors 26A through 26D, 56A through 56B and switch 54. Circuit board 70 is affixed to upper housing 18 and held in place between upper housing 18 and lower housing 16 by pegs 72. Component circuit board 74 is carried in lower housing 16 and carries electrical components indicated at 76. Components 76 are connected to connectors 26A through 26D, 56A through 56B and switch 54 through connector circuit board 70.

Figure 8:
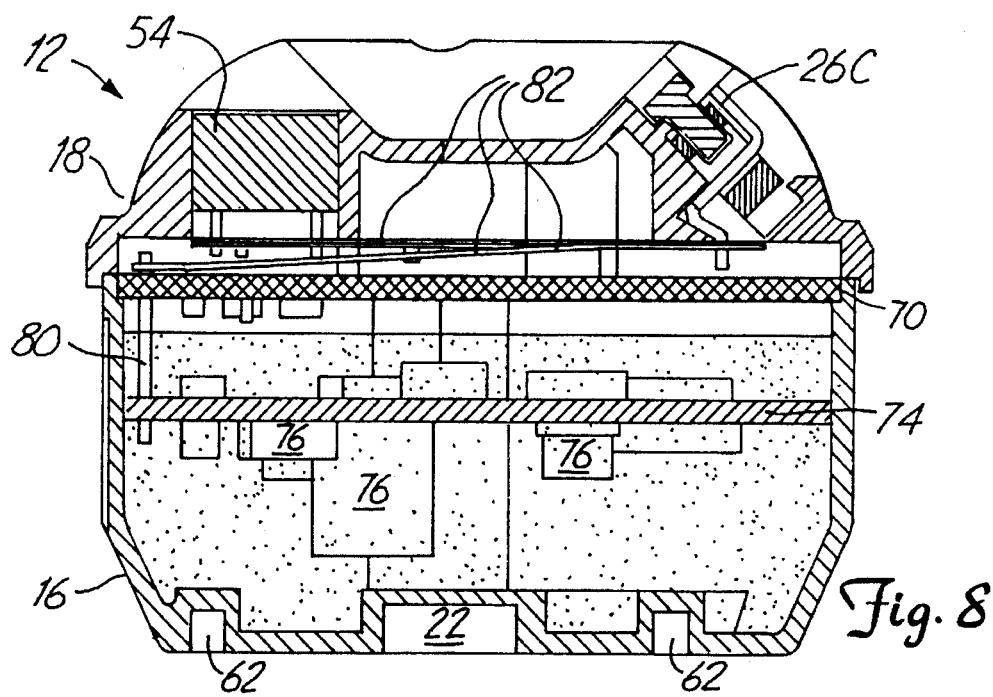
FIG. 8 is a cross-sectional view of the temperature transmitter of FIG. 1 taken along the line labeled 8—8 in FIG. 5.

FIG. 8 is a cross-sectional view of housing 12 taken along the line labeled 8—8 shown in FIG. 5. FIG. 8 shows circuit boards 70 and 74 which are electrically connected together by connector 80. Cabling 82 connects connectors 26A through 26D, 52A and 52B and switch 54 to circuit board 70.

Figure 9:
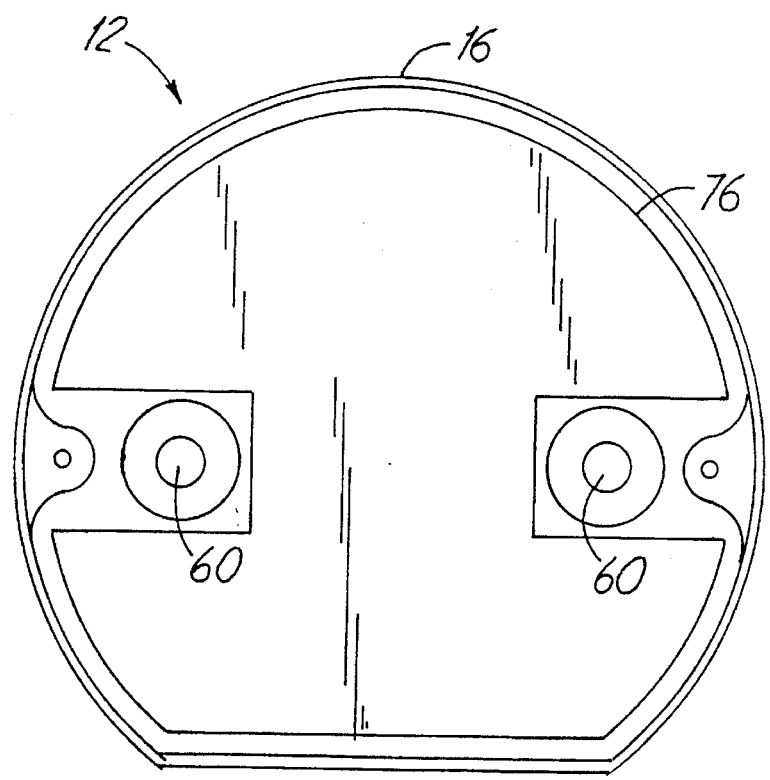
FIG. 9 is a cross-sectional view of the temperature transmitter of FIG. 1 along the line labeled 9—9 in FIG. 7.

FIG. 9 is a cross-sectional view of housing 12 taken along the line labeled 9—9 in FIG. 7. FIG. 9 shows a plan view of lower circuit board 76. As shown in FIG. 9, the passageway which extended through prior art transmitter housings for the probe wiring has been eliminated thereby allowing increased internal space for electronic circuitry.

Figure 10:
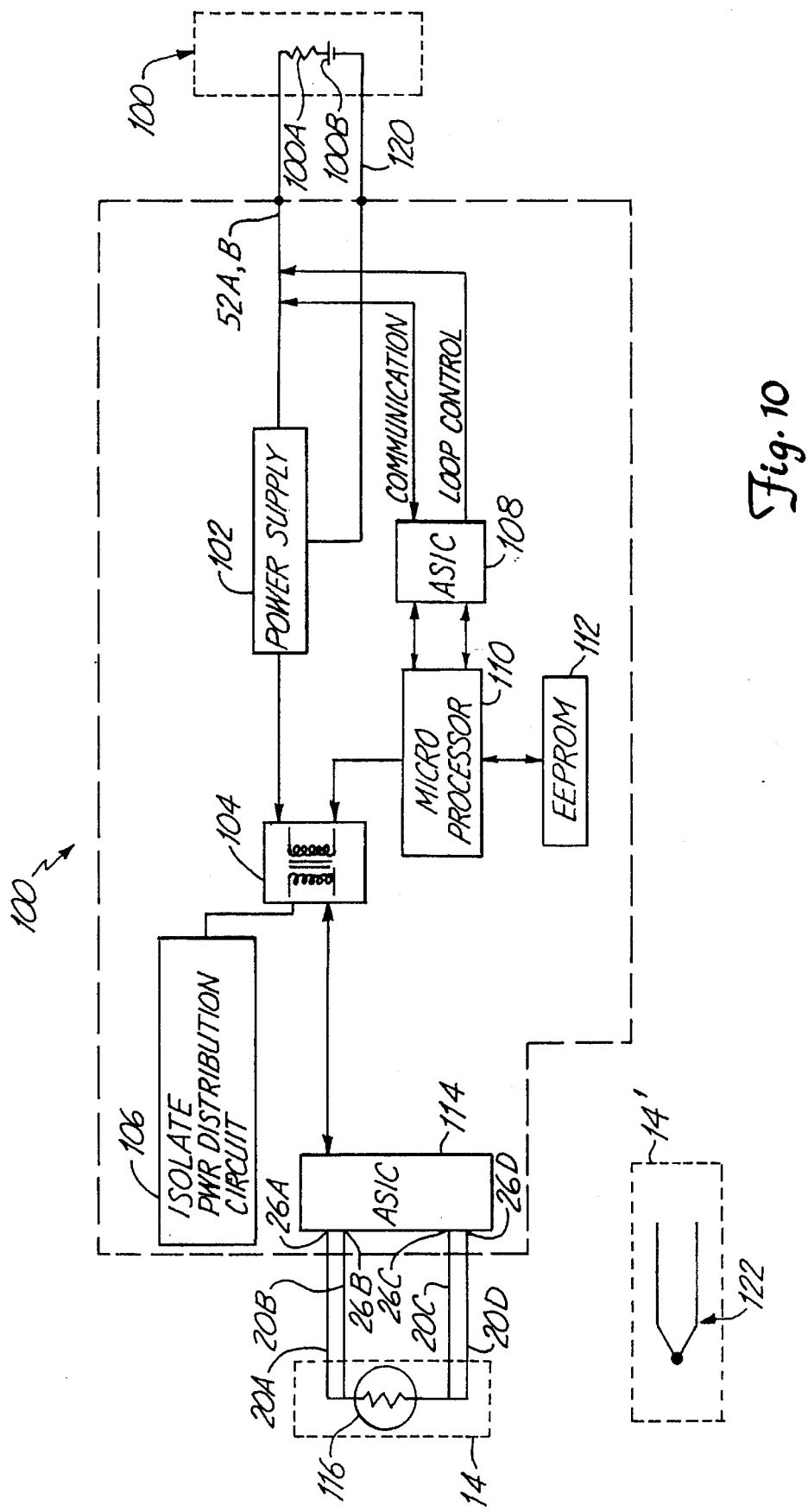
FIG. 10 is a block diagram of electrical circuitry in the transmitter of FIG. 1.

FIG. 10 is a block diagram of transmitter 10 of electrical circuitry on circuit boards 70 and 74. Regulator 102 connects through connectors 52A and 52B to process control loop 120, for example, a standard 4–20 mA current loop of the type used in the process control industry. Transmitter 10 is wholly operated and the current supplied from loop 120 provided from control room 100 which is modelled as a resistor 100A and voltage source 100B. Regulator 102 is connected to transformer 104 which isolates isolated power supply circuit 106 from the current loop. The current loop is also connected to ASIC 108 which operates under the control of microprocessor 110. Microprocessor 110 is also connected to EEPROM 112 and ASIC 114 through transformer 104. ASIC 114 connects to RTD 116 which is carried in probe 14 through wires 20A through 20d and connectors 26A through 26D. In operation, ASIC 114 provides a digital output to microprocessor 11C which is representative of the resistance of RTD 116. Microprocessor 110 operates according to data carried in EEPROM 112 and commands received from the current loop in accordance with, for example, the HART® (a trademark of Rosemount Inc. of Eden Prairie, Minn.) communication protocol. ASIC 108 receives commands from the current loop 120 and passes these commands to microprocessor 110. Additionally, ASIC 108 can modulate digital information from microprocessor 110 onto loop 120 for transmission back to control system (not shown). Further, ASIC 108, under the command of microprocessor 110, controls the current flowing through loop 120 in accordance with temperature of RTD 116. Alternatively, ASIC 114 can be coupled to a probe 14' which contains a thermocouple temperature sensor 122.

The present invention provides for increased internal space in a temperature transmitter housing. One aspect of the invention includes providing a passageway whereby electrical connections around the outside of the housing extend from the probe to connectors on the top of the housing. A passageway is provided between a base plate of the probe and a bottom portion of the transmitter housing. This provides sufficient spacing such that the probe wires can be routed around the transmitter housing. Further, this reduces the assembly time and reduces difficulties in connecting the wires. The compact size is maintained for backwards compatibility in existing installations and efficient use of space in new installations. Further, the additional internal space reduces the complexity of circuit board layout and expense of components.

Although the present invention has been described with reference to preferred embodiments, workers skilled in the art will recognize that changes may be made in form and detail without departing from the spirit and scope of the invention.

What is claimed is:

1. A temperature transmitter, comprising:

a temperature probe for sensing a temperature, said probe having probe wires connected to a temperature responsive element;

electrical circuitry coupled to the probe wires and providing an output related to sensed temperature;

a housing which contains the electrical circuitry and has a first side coupled to the temperature probe and a second side carrying a plurality of electrical terminals connected to the electrical circuitry; and an elongated recess in an outer surface of the first side of the housing adjacent the probe and extending in a direction away from the probe, the elongated recess receiving the probe wires and channeling the probe wires along the outer surface in a direction away from the probe and to the plurality of electrical terminals on the second side of the housing the coupling between the electrical circuitry and the probe wires being through the electrical terminals.

2. The temperature transmitter of claim 1 wherein the temperature probe includes a mounting surface attached to the housing which at least partially covers the elongated recess.

3. The temperature transmitter of claim 1 wherein the housing is formed of a first housing and a second housing, the elongated recess is formed in the first housing and the temperature probe attaches to the first housing.

4. The temperature probe of claim 3 wherein the electrical terminals are carried on the second housing.

5. The temperature transmitter of claim 1, wherein the housing includes loop connectors which connect to the circuitry for coupling the circuitry to a process control loop.

6. The temperature probe of claim 5 wherein the loop connectors are carried on the second side of the housing.

7. The temperature transmitter of claim 1 wherein the temperature responsive element comprises resistance temperature detector.

8. The temperature transmitter of claim 1 wherein the temperature responsive element comprises a thermocouple.

* * * * *

UNITED STATES PATENT AND TRADEMARK OFFICE
CERTIFICATE OF CORRECTION

PATENT NO. : 5,498,079
DATED : March 12, 1996
INVENTOR(S) : Timothy D. Price

It is certified that error appears in the above-indentified patent and that said Letters Patent is hereby corrected as shown below:

Col. 2, line 55, after "includes lower" insert --housing--.

Col. 2, line 59, after "Lower housing" insert --16--.

Col. 4, line 3, please change "11C" to --110--.

Col. 4, line 57, after "the housing" insert --,--.

Col. 6, line 2, after "comprises" insert --a--.

Signed and Sealed this

Fourth Day of March, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,498,079
DATED : March 12, 1996
INVENTOR(S) : Timothy D. Price

It is certified that error appears in the above-indentified patent and that said Letters Patent is hereby corrected as shown below:

Col. 3, line 55, after "Regulator 102" delete the word "and".

Signed and Sealed this

Eighth Day of April, 1997

Attest:

BRUCE LEHMAN

Attesting Officer

Commissioner of Patents and Trademarks